(12) United States Patent
Hall (10) Patent No.: US 10,172,439 B2
(45) Date of Patent: Jan. 8, 2019

(54) SLIM CLIP CASE

(71) Applicant: Jerry Keith Hall, Atlanta, GA (US)

(72) Inventor: Jerry Keith Hall, Atlanta, GA (US)

( * ) Notice: Subject to any disclaimer, the term of this patent is extended or adjusted under 35 U.S.C. 154(b) by 0 days.

(21) Appl. No.: 15/326,669

(22) PCT Filed: Aug. 20, 2014

(86) PCT No.: PCT/IB2014/063985
§ 371 (c)(1),
(2) Date: Jan. 17, 2017

(87) PCT Pub. No.: WO2016/027127
PCT Pub. Date: Feb. 25, 2016

(65) Prior Publication Data
US 2017/0202345 A1    Jul. 20, 2017

(51) Int. Cl.
*H04M 1/00* (2006.01)
*A45F 5/02* (2006.01)
*H04B 1/3888* (2015.01)
*A45C 11/00* (2006.01)
*H04M 1/02* (2006.01)

(52) U.S. Cl.
CPC .............. *A45F 5/021* (2013.01); *A45C 11/00* (2013.01); *H04B 1/3888* (2013.01); *H04M 1/0202* (2013.01); *A45C 2011/001* (2013.01); *A45C 2011/002* (2013.01); *A45F 2200/0516* (2013.01)

(58) Field of Classification Search
CPC ... A45F 5/021; A45C 11/00; A45C 2011/001; A45C 2011/002; H04B 1/3888; H04M 1/0202

USPC ........... 455/575.1, 575.8, 90.3; 224/197, 199
See application file for complete search history.

(56) References Cited

U.S. PATENT DOCUMENTS

| | | | | |
|---|---|---|---|---|
| 3,743,147 | A * | 7/1973 | Wilczynski | A45F 5/02 224/199 |
| 4,419,794 | A * | 12/1983 | Horton, Jr. | A45F 5/02 224/197 |
| 5,938,010 | A * | 8/1999 | Osterbye | A45C 11/182 206/38 |
| 7,832,606 | B2 * | 11/2010 | Sin | A45F 5/02 224/197 |
| 8,573,458 | B1 * | 11/2013 | Hamilton | A45F 5/021 224/250 |
| 8,636,183 | B1 | 1/2014 | Steiner | |
| 8,730,656 | B2 * | 5/2014 | Prest | G06F 1/181 361/679.01 |

(Continued)

OTHER PUBLICATIONS

International Search Report and Written Opinion of the International Searching Authority in International Application No. PCT/IB14/63985, dated Jun. 18, 2015.

*Primary Examiner* — Sonny Trinh
(74) *Attorney, Agent, or Firm* — Matthew M. Googe; Robinson IP Law, PLLC (57) ABSTRACT

A mobile phone case is provided having a cover shaped to fit snugly around and cover sides and a back of a mobile phone inserted into the cover, the cover having a flat back portion, and a slit formed in the cover between the flat back portion of the cover and sides of the cover for mounting the mobile phone case to a belt. The flat back portion is configured to open with respect to the sides of the cover along the slit such that the mobile phone case is capable of tightly receiving a belt within the slit between the flat back portion and sides of the case.

7 Claims, 7 Drawing Sheets

(56) References Cited

U.S. PATENT DOCUMENTS

| | | | | |
|---|---|---|---|---|
| 8,899,458 B1* | 12/2014 | Heien | ................... | A45F 5/021 |
| | | | | 224/236 |
| 9,314,093 B2* | 4/2016 | Heien | ................... | A45F 5/021 |
| 9,876,522 B2* | 1/2018 | Huang | ................ | H04B 1/3888 |
| 2011/0073608 A1 | 3/2011 | Richardson et al. | | |
| 2011/0294556 A1* | 12/2011 | Carlberg | ................ | A45C 11/00 |
| | | | | 455/575.8 |
| 2012/0190413 A1* | 7/2012 | Ojeda | ................... | A45F 5/021 |
| | | | | 455/575.8 |
| 2013/0140195 A1 | 6/2013 | Law et al. | | |
| 2013/0157730 A1 | 6/2013 | McCormac et al. | | |
| 2013/0214018 A1* | 8/2013 | Zhang | ................... | A45F 5/021 |
| | | | | 224/269 |
| 2013/0214019 A1* | 8/2013 | Wu | ....................... | B62J 11/00 |
| | | | | 224/413 |
| 2014/0312092 A1* | 10/2014 | Waters | ................... | A45F 5/021 |
| | | | | 224/671 |

* cited by examiner

SLIM CLIP CASE

CROSS-REFERENCE TO RELATED APPLICATION

This application claims priority under all applicable statutes, and is a U.S. National phase application (35 U.S.C. § 371) of International Application No. PCT/IB2014/063985, filed on Aug. 20, 2014, and entitled SLIM CLIP CASE, the contents of which are incorporated herein by reference in its entirety.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

This invention relates to mobile phones or media players and other portable/mobile electronics and devices aimed at providing a useful cover for smart phones or media players for their protection aimed at all the users of smart phones and media players. More specifically, the disclosed invention relates to a cover designed for smart phones, media players and other portable/ mobile electronics and devices which does not use a clip as an attachment on the cover, as is used by other covers, but has an inbuilt clip which is very thin welded on to the back of the cover. The cover itself is very thin and hence the cover with the clip is very light weight and does not spoil the aesthetics of the cover unlike other covers designed for mobile phones or media players.

With the invention of mobile phones and their proliferation during the past decade, mobile phones have become the necessity of the people and therefore its demand has led to extensive research in this field, and the technological advancements have led to newer applications being invented which can be used in a single mobile phone and has also led to the shrinking of the size of the phone. Therefore, now the mobile phones have a variety of applications, through the internet, people are connected throughout the world and the internet has become a necessity today where people not only connect with each other, but also exchange ideas and valuable information on the internet. This has led to the invention of smart phones which has helped people remain connected while on the move. The smart phones are mini computers which help people access data and process information.

The current invention provides for protection of such smart phones and media players as their users carry them all the time while at home, in the office or on the move. The protection provided is in the form of a poly carbonated cover, making the back of the cover/cover the clip that is used to secure the smart phone and/or media player to a waistband or belt or other surface that is chosen by the user, a very thin clip is joined to the cover by ultrasonic welding to the cover.

No invention to the knowledge of the inventor has disclosed an apparatus which has features as that of the present invention. No other invention has provided for an apparatus with portability, extra protection, lightweight, and which tightly clamps on and the phone cannot fall or slip off easily.

The limitations and non-effectiveness of the prior art has been overcome by the instant invention as described below.

1) In a previously published patent, Patent Publication No. —U.S. Pat. No. 8,177,107 B2, Publication Date—15 Mar., 2012, a patent for mobile covers was patented, but the clip is not welded to the back of the cover with the ultrasonic welding as is done in the present invention which provides strength and durability and does not spoil the aesthetics of the cell phone. This application only attaches a new component and does not use the back cover itself.
2) In a previously published patent, Publication no. —U.S. Pat. No. 7,110,802 B1, Publication Date—Sep. 19, 2006, a patent for mobile covers was patented, but the clip is again not welded to the back of the cover with the ultrasonic welding as is done in the present invention which provides strength and durability and does not spoil the aesthetics of the cell phone. This application also does not use the functions of the current invention, this is in fact a holster.
3) In a previously published patent, Publication no.—WO2007142382 A1, Publication Date—Dec. 13, 2007, a patent for mobile covers was patented, but the clip is again not welded to the back of the cover with the ultrasonic welding as is done in the present invention which provides strength and durability and does not spoil the aesthetics of the cell phone. This application focuses on rotation of the mobile phone at different angles when the cover is put on the cell phone.

BRIEF SUMMARY OF THE INVENTION

The invention is a mobile phone cover which is extra slim which does not distort the shape of the mobile phone, poly carbonated cover, making the back of the cover/cover the clip that is used to secure the smart phone and/or media player to a waistband or belt or other surface that is chosen by the user, a very thin clip is joined to the cover by ultrasonic welding to the cover. The cover is made up of poly-carbonated material. The back of the cover/cover is the clip that is used to secure the smart phone and/or media player to a waistband or belt or other surface that is chosen by the user, a very thin clip is joined to the cover by ultrasonic welding to the cover.

The invention consists of a polycarbonate cover which is used for the protection of mobile phones and media players.

The back of the cover consists of a clip at the back of the cover/cover that is used to secure the smart phone and/or media player to a waistband or belt or other surface that is chosen by the user.

It is the object of the invention to provide for a protection for the mobile phones and media players. The back of the cover/cover is the clip that is used to secure the smart phone and/or media player to a waistband or belt or other surface that is chosen by the user.

It is also the object of the present invention to provide for a solution to the clip at the back of the cover which is always present in normal covers. The invention provides a solution to the clip by incorporating the clip at the back of the cover of the mobile phone. The clip is very thin and is welded with the help of ultrasonic welding. Therefore, the product is very strong and durable.

These and other features, objects and advantages of the present invention will be readily apparent to persons of ordinary skill in the art upon reading the entirety of this disclosure, which includes the accompanying drawings and claims.

There are also alternative methods of manufacturing this design without the ultrasonic welding technique when it is constructed as a single unit of materials. It is a Triple mold technique that had one mold for the back, another mold for the rim and another that incorporated the other two allowing for the clip function to integrated. Alternative materials that may be used are such as metal, fabrics, woods, alternative plastics or other organic materials to achieve the same functional and aesthetic result.

BRIEF DESCRIPTION OF THE SEVERAL VIEWS OF THE DRAWINGS

FIG. 1 shows the side view of the phone with the cover. This cover, unlike other covers, does not have a separate projection in the form of a clip at the back for the user to insert it in his belt. This cover is very thin in itself and it has a piece of plastic welded at the back which cannot be observed if looked at, casually but is visible when minutely looked at. This plastic acts as a clip for the users to fasten the mobile phone on to their belts very easily. The cover does not spoil the aesthetics of the cell phone like the other covers as it is neither bulky nor big, but fits snugly on to the mobile phone and tightly holds it, at the same time, the mobile phone is very convenient to use with the cover on, as is evident from the drawing and the user can very easily hold the phone in his hands without feeling the heaviness which is generally associated with the covers available in the market.

FIG. 2 shows the side view of the phone with the cover on. The slit, as can be seen at the back, is the place from where the cell phone is inserted into the belt of the user and the slit is formed as separate piece of the plastic is welded on to the cover by ultrasonic welding on to the cover's backside which provides stability and strength to the welded plastic chip which acts as a clip for the cover to hold the mobile phone.

DETAILED DESCRIPTION OF THE INVENTION

In the present disclosure, numerous specific details are provided, such as examples of module, components, and method, to provide a thorough understanding of embodiments of the invention. Persons of ordinary skill in the art will recognize, however, that the invention can be practiced without one or more of the specific details. In other instances, well-known details are not shown.

Figure 1:
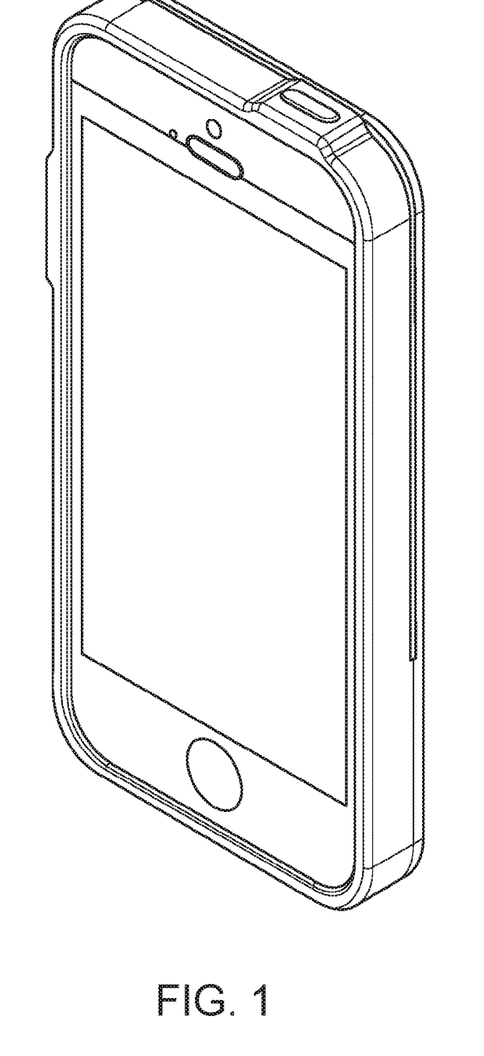

This cover, unlike other covers, does not have a separate projection in the form of a clip at the back for the user to insert it in his belt. This cover is very thin in itself and it has a piece of plastic welded at the back which cannot be observed if looked at, casually but is visible when minutely looked at.

This plastic acts as a clip for the users to fasten the mobile phone on to their belts very easily. The cover does not spoil the aesthetics of the cell phone like the other covers as it is neither bulky nor big, but fits snugly on to the mobile phone and tightly holds it, at the same time, the mobile phone is very convenient to use with the cover on, as is evident from the drawing and the user can very easily hold the phone in his hands without feeling the heaviness which is generally associated with the covers available in the market.

Figure 2:
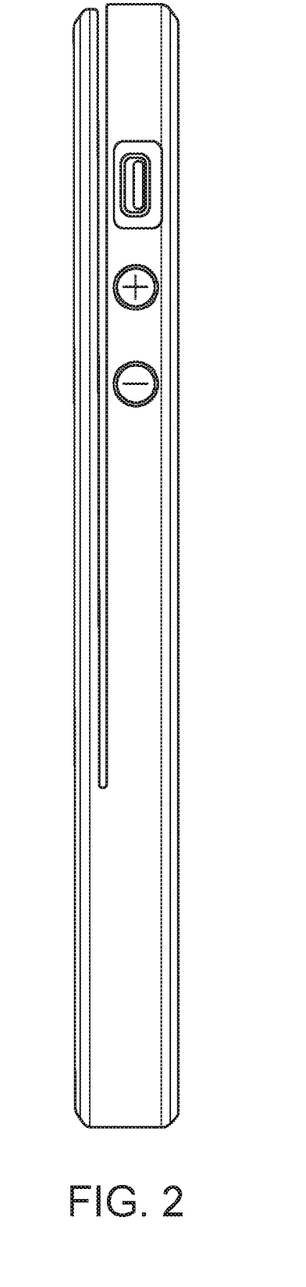
Figure 3:
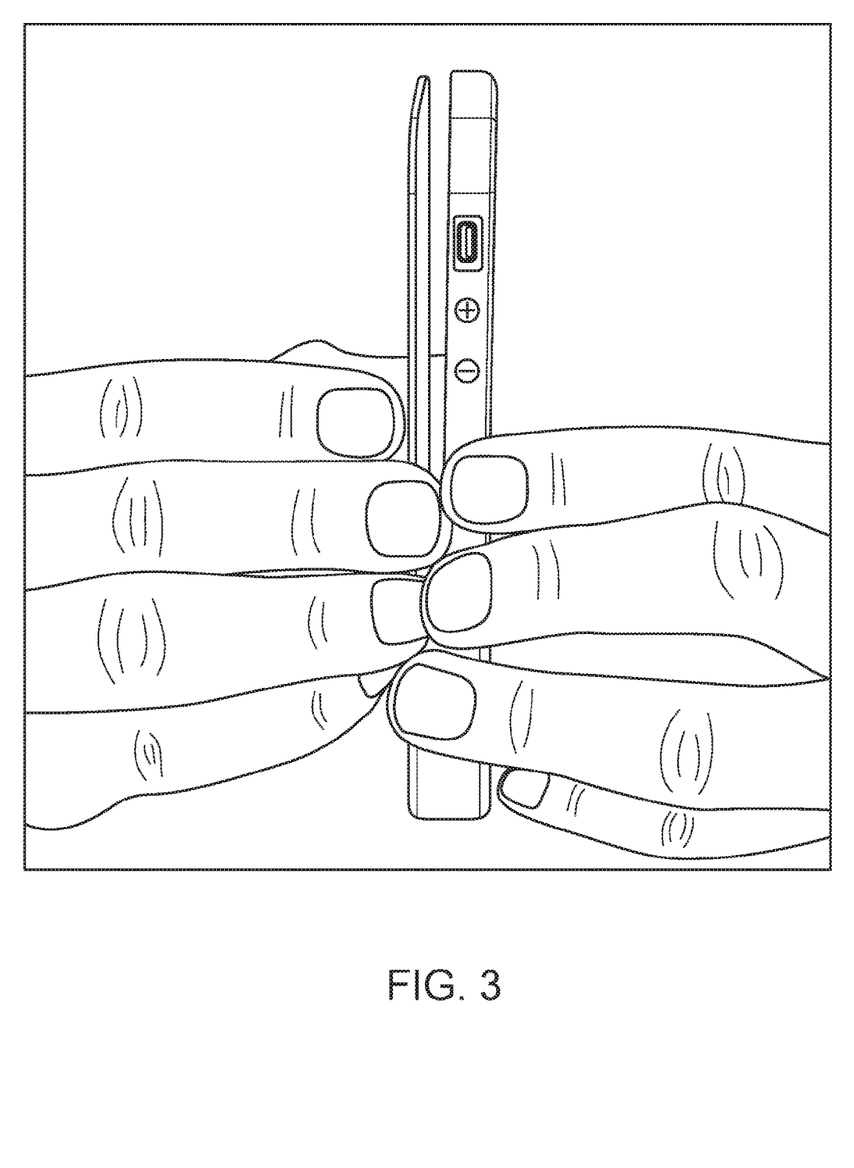
FIG. 3 shows the clip when it is opened slightly in order to show that the clip can be expanded so as to fit on a belt of certain thickness, and when the clip is released, it snaps back into place, tightly holding the cell phone.
Figure 4:
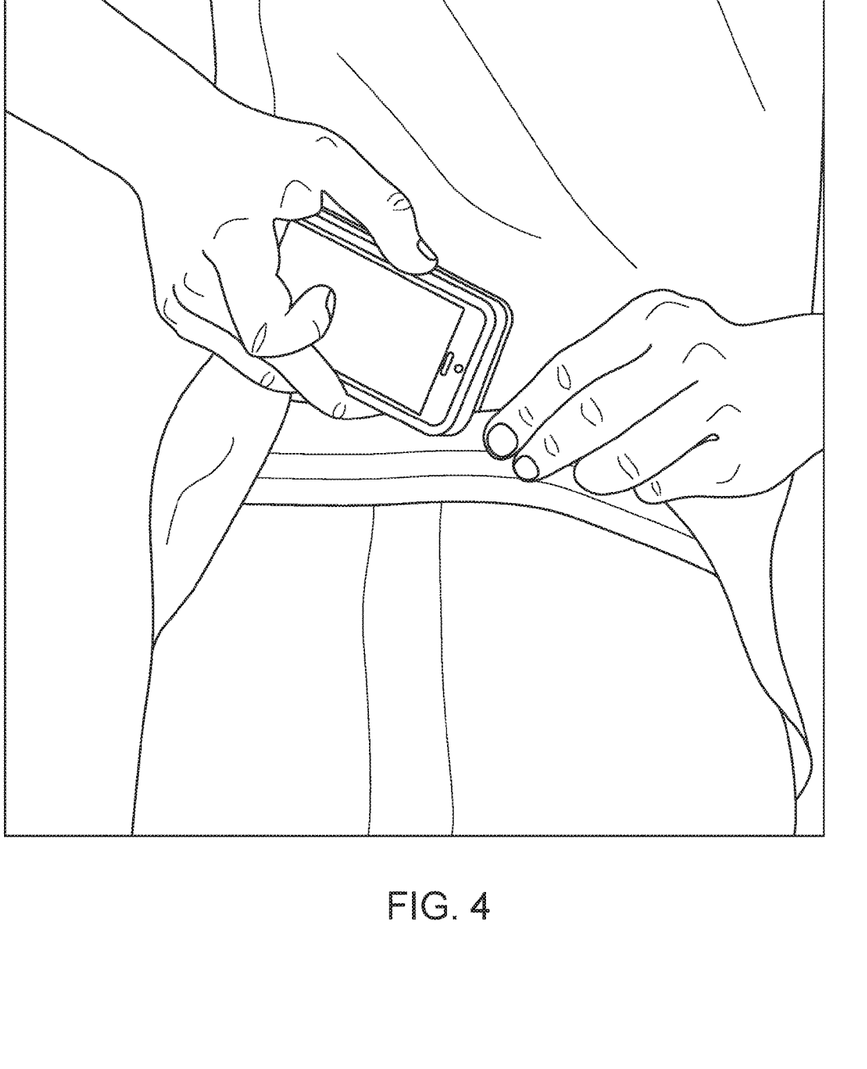
FIG. 4 shows the mounting of the cell phone on to the belt. The clip at the back is opened slightly so that the cover, along with the cell phone fits tightly on to the belt and then the clip is released, so that the cell phone or media player or other mobile deice is fixed tightly on to the belt or waist of the user.
Figure 5:
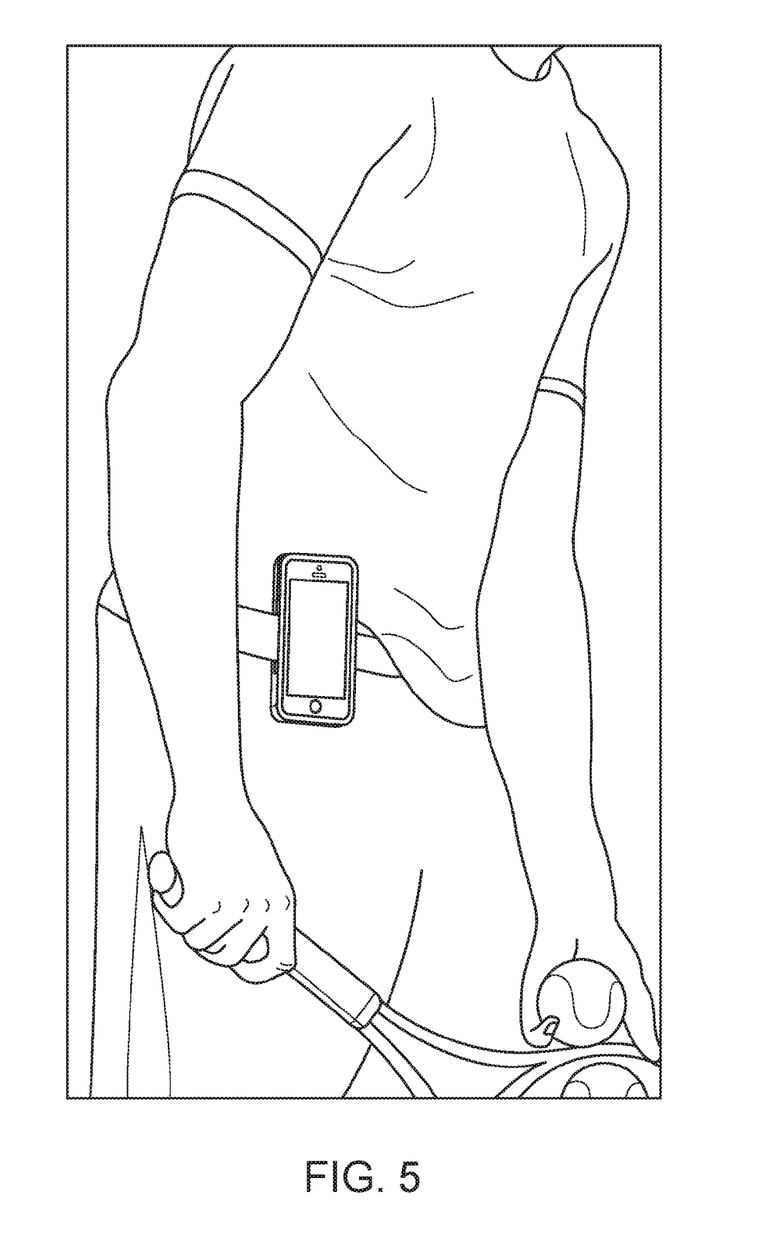
FIG. 5 shows the user playing tennis with the cell phone tightly attached to his waist band or belt. It shows that the user can indulge in sports without any danger to his cell phone.
Figure 6:
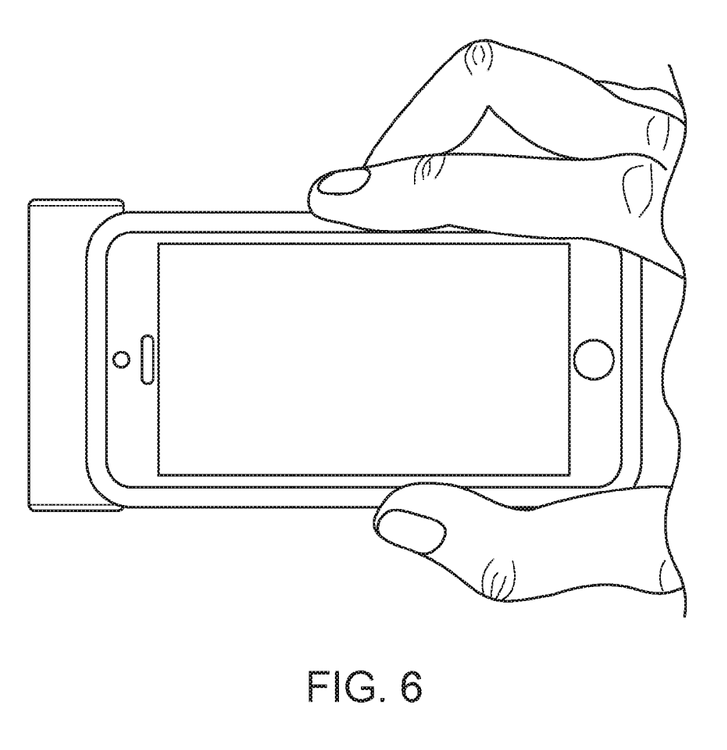
FIG. 6 shows the cell phone if attached to a bar like device on the wall.
Figure 7:
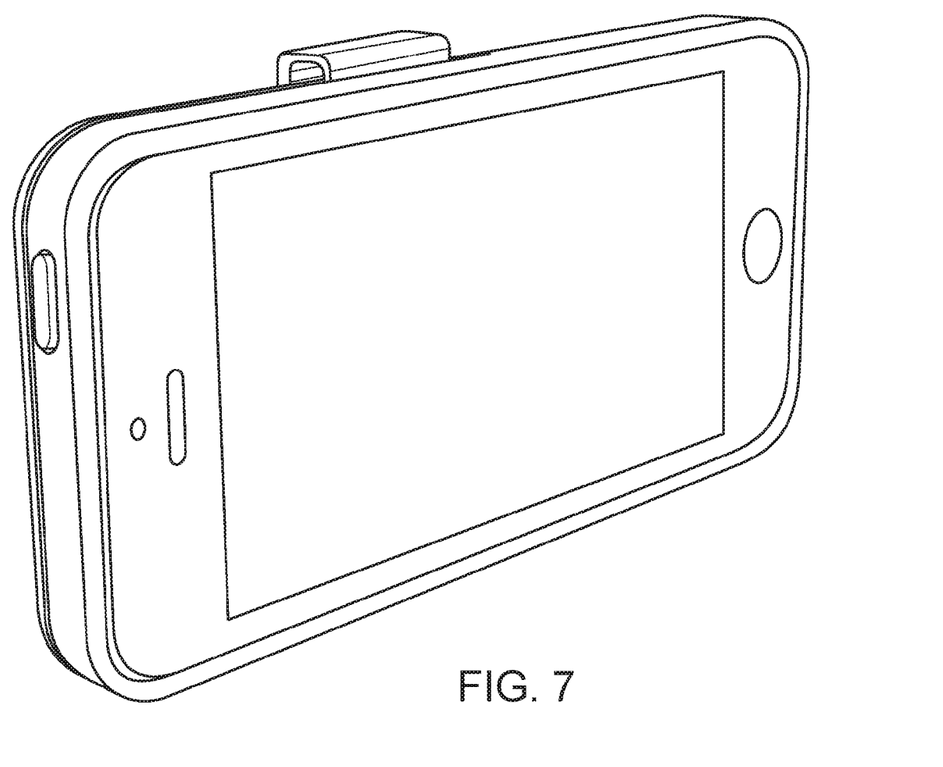
FIG. 7 again shows another view of the cell phone attached to bar like device.

FIG. 2 shows the side view of the phone with the cover on. The slit, as can be seen at the back, is the place from where the cell phone is inserted into the belt of the user and the slit is formed as separate piece of the plastic is welded on to the cover by ultrasonic welding on to the cover's backside which provides stability and strength to the welded plastic chip which acts as a clip for the cover to hold the mobile phone.

While specific embodiments of the present invention have been provided, it is to be understood that these embodiments are for illustration purposes and not limiting. Many additional embodiments will be apparent to persons of ordinary skill in the art reading this disclosure.

The securing clip on the rim of the slimclip case can be extended to include a latching mechanism to secure the back clip of the slimclip case when the clip is not in use.

What is claimed is:

1. A mobile phone case comprising:
   a cover shaped to fit snugly around and cover sides and a back of a mobile phone inserted into the cover, the cover having a rigid flat back portion covering a back of a phone when the phone is placed in the cover;
   a slit formed in the cover between the flat back portion of the cover and sides of the cover for mounting the mobile phone case to a belt, the slit having an open end located at an end of the cover;
   wherein the rigid flat back portion and cover sides form a single piece such that the rigid flat back portion is an integral part of the cover;
   wherein the rigid flat back portion is configured to resiliently flex open with respect to the sides of the cover along the slit such that the mobile phone case is capable of tightly receiving one of a belt and waistband within the slit through the open end of the slit and between the rigid flat back portion, sides of the case, and the back of the phone when the phone is placed in the cover, such that the one of belt and waistband is adjacent the back of the phone.

2. The mobile phone case of claim 1, wherein the rigid flat back portion is initially formed of a separate piece that is integrally attached to the cover such that the rigid flat back portion and cover sides form a single piece, and wherein the slit is formed between the separate flat back portion and cover of the mobile phone case.

3. The mobile phone case of claim 2, wherein the separate back portion piece is ultrasonically welded to the cover of the mobile phone case.

4. The mobile phone case of claim 1, wherein the slit extends from an end of the mobile phone case to a point at least halfway along a length of the mobile phone case.

5. The mobile phone case of claim 1, wherein the case is constructed of a material selected from the group consisting of metals and plastics.

6. A mobile phone case comprising:
a cover shaped to fit snugly around and cover sides and a back of a mobile phone inserted into the cover, the cover having a rigid flat back portion covering a back of a phone when the phone is placed in the cover;
a slit formed in the cover between the rigid flat back portion of the cover and sides of the cover for mounting the mobile phone case to a belt, the slit having an open end located at an end of the cover;
wherein the rigid flat back portion and cover sides form a single piece such that the rigid flat back portion is an integral part of the cover;
wherein the rigid flat back portion is configured to resiliently flex open with respect to the sides of the cover along the slit such that the mobile phone case is capable of tightly receiving one of a belt and waistband within the slit between the rigid flat back portion, sides of the case, and the back of the phone when the phone is placed in the cover, such that the one of belt and waistband is adjacent the back of the phone; and
wherein the rigid flat back portion is initially formed of a separate piece that is integrally attached to the cover such that the rigid flat back portion and cover sides form a single piece, and wherein the slit is formed between the separate rigid flat back portion and cover of the mobile phone case.

7. A mobile phone case comprising:
a cover shaped to fit snugly around and cover sides and a back of a mobile phone inserted into the cover, the cover having a rigid flat back portion covering a back of a phone when the phone is placed in the cover;
a slit formed in the cover between the rigid flat back portion of the cover and sides of the cover for mounting the mobile phone case to a belt, the slit extending from an end of the mobile phone case to a point at least halfway along a length of the mobile phone case, the slit having an open end located at an end of the cover;
wherein the rigid flat back portion and cover sides form a single piece such that the rigid flat back portion is an integral part of the cover;
wherein the rigid flat back portion is configured to resiliently flex open with respect to the sides of the cover along the slit such that the mobile phone case is capable of tightly receiving one of a belt and waistband within the slit between the rigid flat back portion, sides of the case, and the back of the phone when the phone is placed in the cover, such that the one of belt and waistband is adjacent the back of the phone; and
wherein the rigid flat back portion is initially formed of a separate piece that is integrally attached to the cover such that the rigid flat back portion and cover sides form a single piece, and wherein the slit is formed between the separate rigid flat back portion and cover of the mobile phone case.

* * * * *